(No Model.)
T. G. OWEN.
TRUSS.
No. 273,590. Patented Mar. 6, 1883.
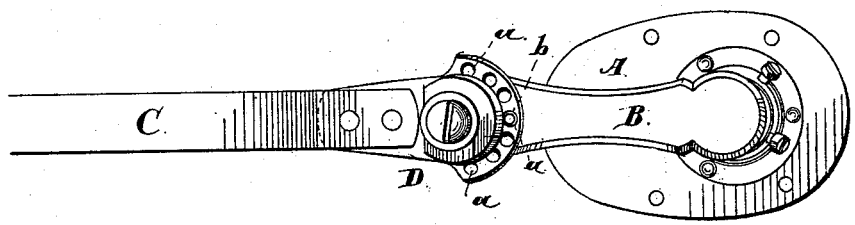
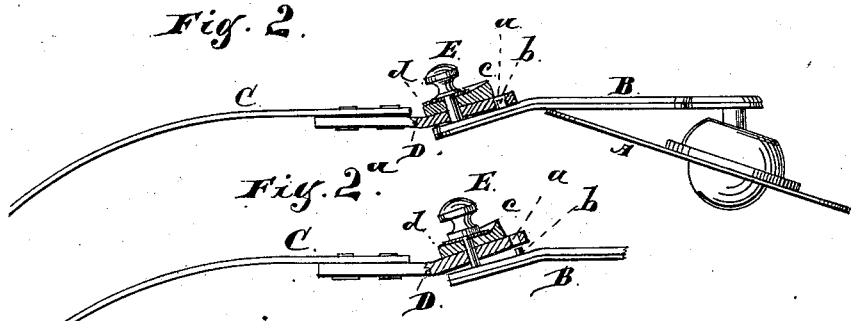
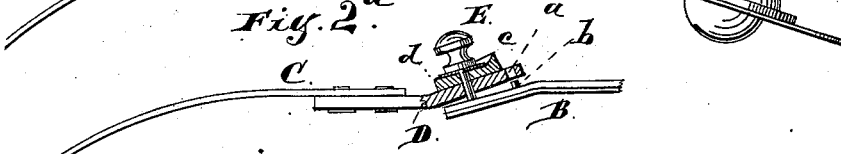
Witnesses:
E. A. West.
A. H. Adams.
Inventor
Thomas G Owen

UNITED STATES PATENT OFFICE.

THOMAS G. OWEN, OF CHICAGO, ILLINOIS, ASSIGNOR TO ANDREW H. PARKER, OF SAME PLACE.

TRUSS.

SPECIFICATION forming part of Letters Patent No. 273,590, dated March 6, 1883.

Application filed October 10, 1882. (No model.)

*To all whom it may concern:*

Be it known that I, THOMAS G. OWEN, residing at Chicago, in the county of Cook and State of Illinois, and a citizen of the United States, have invented a new and useful Improvement in Trusses, of which the following is a full description, reference being had to the accompanying drawings, in which—

Figure 1 is a plan; Fig. 2, a side elevation, part being in section. Fig. 2ª is a side elevation of the parts represented, showing the position into which these parts can be brought for the purpose of adjusting them. Fig. 3 is a modification.

I have only shown such part of the truss as is necessary to illustrate my improvement.

It has been common to connect the arm which carries the truss-plate with the truss-spring by means of a screw, and also to provide the end of the spring with a series of holes to receive a pin upon the arm, which enters some one of these holes, and serves, when in such hole, in connection with a clamping-screw, to hold the arm in any desired position. To adjust these parts it has heretofore been necessary to release the screw, make the adjustment, and then tighten the screw again.

The object of my invention is to provide for this adjustment without loosening the screw, which I accomplish by providing a spring so arranged that its tendency is to hold the arm and the end of the truss-spring proper in contact with each other, but which allows the pin upon the arm to be released from the holes in the truss-spring for the purpose of adjusting these two parts relatively to each other.

In the drawings, A represents the truss-plate.

B is an arm, the outer end of which is connected with the truss-plate by a ball-and-socket joint, as usual.

C is the truss-spring.

D is a piece of metal, which is riveted to the end of the truss-spring C. This piece of metal D is provided with a series of holes, $a$, arranged in the arc of a circle. The arm B is provided with a projecting stud or pin, $b$, arranged to enter some one of the holes $a$.

E is a screw by means of which the arm B and spring C are connected, the lower end of the screw entering a screw-threaded hole in the arm B.

$c$ is a piece of rubber placed between the head of the screw and the part D. This rubber serves the office of a spring, and when compressed by the action of the screw the outer portion presses with some force upon the top of the part D.

$d$ is a washer between the rubber $c$ and the head of the screw.

By holding the arm B in one hand and the spring C in the other, and using a little force, the two parts B C can be brought into the position shown in Fig. 2ª, releasing the pin $b$ from the hole $a$, in which it may have been placed. Then these two parts B and C can be turned one upon the other, bringing the pin to any one of the holes $a$, and thus the position of the two parts B C relatively to each other can be adjusted without loosening the screw.

Instead of the rubber $c$, a light metal spring might be used, which would accomplish the same object, although I prefer the rubber. In Fig. 3, I have shown this modification, in which $e$ represents a light metal spring, secured at one end to the truss-spring C, while the other end rests upon the part D, the screw E passing through the spring $e$. By properly adjusting the screw the spring $e$ can be made to press upon the part D, and its action is similar to that of the rubber $c$. The end of the truss-spring might be so formed and arranged as to perform the office of the spring $e$ when the part D is used.

The part D may be regarded as a part of the truss-spring C, though in manufacturing it is usual to make the spring and the part D separate from each other, and rivet them together, as shown.

Instead of the rubber spring, a short spiral metal spring located between the head of the screw and the part D might be used; but I prefer the rubber.

What I claim as new, and desire to secure by Letters Patent, is as follows:

In a truss, the combination of the arm B, provided with the stud $b$, the truss-spring C, provided with a series of holes, $a$, a device connecting the arm and truss-spring, and a spring, $c$, for retaining the stud of the arm in engagement with one of the holes of the truss-spring, substantially as described, whereby the arm and the truss-spring are held under ordinary conditions, but permitted to be separated for changing the stud from one of the said holes to another, as set forth.

THOMAS G. OWEN.

Witnesses:
E. A. WEST,
O. W. BOND.